United States Patent

[11] 3,549,788

[72] Inventors John R. Apen
Towson;
Andrew W. Lebert, Lutherville, Md.
[21] Appl. No. 790,652
[22] Filed Jan. 13, 1969
[45] Patented Dec. 22, 1970
[73] Assignee Bell Telephone Laboratories Incorporated
Murray Hill, N.J.
a corporation of New York

[54] FLAT-PROFILE SUBMARINE COAXIAL CABLE WITH TORQUE BALANCE
6 Claims, 5 Drawing Figs.
[52] U.S. Cl....................................................... 174/107,
174/115, 174/117
[51] Int. Cl..................................................... H01b 7/14
[50] Field of Search........................................... 174/105,
107, 115, 117, 117.1, 117.11

[56] References Cited
UNITED STATES PATENTS
1,977,787  10/1934  Wodtke.......................  174/115
2,754,351  7/1956   Horn............................  174/105
3,020,334  2/1962   Riley...........................  174/107
3,033,916  5/1962   Scofiely.......................  174/115X
FOREIGN PATENTS
712,656    6/1965   Canada.......................  174/117

Primary Examiner—E. A. Goldberg
Attorneys—R. J. Guenther and Edwin B. Cave

ABSTRACT: This disclosure describes a torque-balanced submarine cable structure that also resists externally applied twist. It is characterized by substantially flattened outer top and bottom walls and rounded sidewalls, with components arranged in planar fashion within. External twist present during laying is opposed at the cable sheave by forces acting through a moment arm associated with the flat aspect of the cable.

PATENTED DEC 22 1970  3,549,788

INVENTORS J. R. APEN
A. W. LEBERT
BY
Charles E. Graves
ATTORNEY

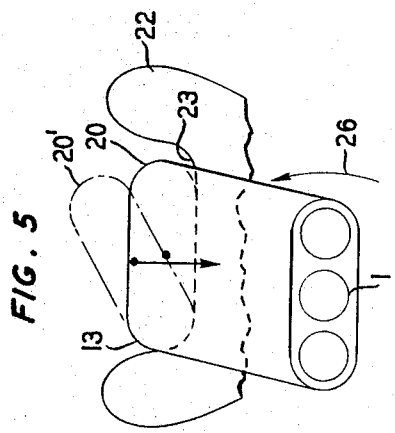
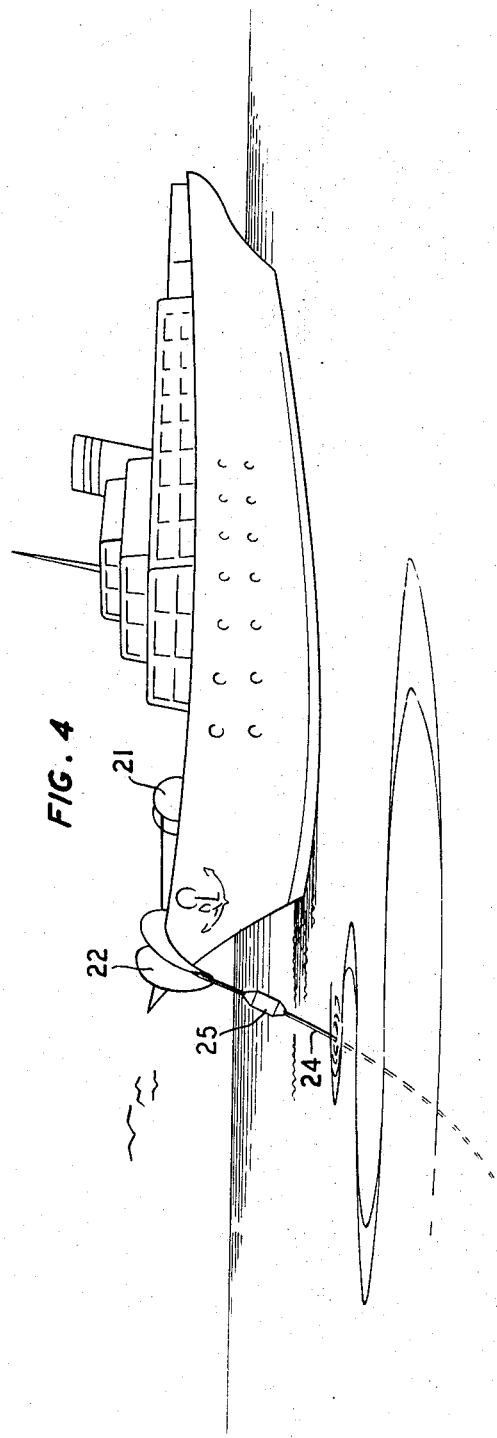

ered torque.
FLAT-PROFILE SUBMARINE COAXIAL CABLE WITH TORQUE BALANCE

GOVERNMENT CONTRACT

The invention herein claimed was made in the course of, or under contract with the Department of the Navy.

FIELD OF THE INVENTION

This invention concerns submarine electrical cable and in particular torque-balanced submarine communications cable capable of being safely coiled in the storage tanks of cable-laying ships.

BACKGROUND OF THE INVENTION

Steel wire is used in many submarine cables to supply supportive strength to the cable during the laying operation; and in other cables to provide a protective armored covering around the cable to prevent damage from various environmental hazards. As the wires are normally in the shape of a helix in each case, they have a natural tendency to unravel or straighten out when placed in tension during the laying process. If the tendency is not countered, the cable experiences a strong turning moment which can severely stress cable couplers and the cable interiors.

In instances where the steel wire merely supplies supportive strength, and no exterior armor is needed, various rope or strand wire schemes are available to counter the torsion-tension problem. Such wire rope or strands are suitably included in an interior portion of the cable beneath a protective jacket, whose outer circumference is circular in cross section to meet what were believed significant considerations of forming and coiling. If the cable is coaxial, the wire strands typically may be located apart from the coaxial structure, as, for example in the cable depicted in U.S. Pat. No. 3,020,334.

Although satisfactory from the standpoint of torque balance such submarine coaxial cable configurations are vulnerable to damage under certain cable-laying conditions. If, for example, a first cable being laid is coupled to a second cable in which a torque is either present or will develop when tension is applied, then such torque is transferred to the first cable causing it to twist. Under these conditions, as the first cable is paid out over the sheave of the cable ship, the steel strand will periodically rotate to a position above the coaxial unit subjecting it to potentially damaging crushing forces.

Accordingly, one object of the invention is to realize in a submarine cable a torque balance with respect to internal forces, and at the same time a significant resistance to twist from an external source.

A further object of the invention is to realize such a cable which also can be coiled without hazard or extreme difficulty in the storage tanks of a cable ship.

SUMMARY OF THE INVENTION

In achieving these objects, the invention departs from conventional submarine coaxial cable circular configurations and instead employs a cable characterized by flattened top and bottom portions and rounded sides. The cable width is of the order of three times greater than the height. In one embodiment, the strength member is a single, torque-balanced steel wire rope placed in the geometric center of the flat cable and flanked by communications units of substantially the same diameter, one of which is a coaxial unit. All three components are enclosed in an outer jacket of, for example, polyethylene, formed in the prescribed flattened and round-sided profile.

Other embodiments of the inventive concept incorporate two wire ropes or strands, torque balanced as against each other, flanking one or two center communication units, one of which is a coaxial. Further, the invention embraces a two-unit flat cable, one unit comprising a torque-balanced single strand and the other comprising the coaxial cable.

In all embodiments, pursuant to one aspect of the invention, the flat cable aspect resists exterior twist at the sheave by developing a substantial opposing torque through a moment arm acting at a fulcrum consisting of one or the other of the cable's rounded sides. The opposing moment is maintained at the sheave as cable is paid out.

The invention, its further objects, features and advantages will be readily apprehended from the detailed description to follow.

DESCRIPTION OF THE DRAWING

FIG. 4 is a perspective showing of the new cable structure during the laying process; and FIG. 5 is a schematic end perspective showing the cable passing over the cable ship bow or stern.

DETAILED DESCRIPTION OF AN ILLUSTRATIVE EMBODIMENT

Figure 1:
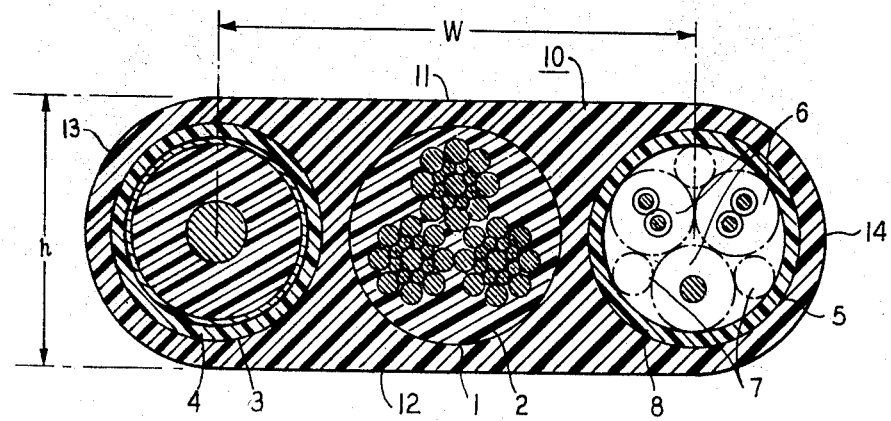
FIGS. 1—3 are sectional views of cables embodying the invention.

The cable of FIG. 1 consists first of a single central torque-balanced rope, designated 1, which is commercially available in diameters of from five thirty-seconds inch to 1⅛ inches. Wire rope 1 is covered with a jacketing 2 of for example high density polyethylene. Flanking it to the left is a conventional coaxial line 3 in a polyethylene jacket 4. To the right is a secondary system 5 comprising an insulated plurality of conductor pairs 6 with filler strands 7 enveloped in a jacketing 8. Jackets 2, 4, and 8 advantageously are of the same diameter which typically is 1.25 inches. The axes of coaxial line 3, wire rope 1 and system 5 fall in a common plane.

The cable components are held in position by an outer jacket 10 of for example high density polyethylene, and characterized by a flat profile. The top 11 and bottom 12 are separated by a distance of about 1.6 inches; and the flat portions denoted by W are about 2.8 inches across. The sides 13, 14 are rounded.

The FIG. 1 cable is torque-balanced, by virtue of wire rope 1; and, pursuant to the invention, also has the capacity to resist at sheaves externally applied turning moments that can arise during laying, as demonstrated in FIGS. 4 and 5. The cable, designated 20, is coiled in storage tanks, not shown, aboard ship. A cable engine 21 removes the cable from the tanks and feeds it at a controlled rate through a sheave 22. The latter is adapted with a flattened bed 23 to accommodate the inventive cable 20, which is shown having just been connected to a conventional cable 24 through a coupling 25.

If cable 24 is not torque balanced, then when placed in tension it will generate a torque that is transmitted back through coupling 25 to whatever cable is being paid out over sheave 22. If further, the latter cable is a coaxial unit, provision must be made for protecting the coaxial structure from being crushed between the wire rope and the sheave. This object is readily realized through the present invention by the opposition to the external torque (from cable 24, denoted by the arrow 26) which is generated by the flattened bottom of cable 20.

Specifically, as seen in FIG. 5 as the torque 26 reaches the sheave, it exerts a tilting force on the cable 20 which tends to place the cable 20 in the broken line position 20. Any such tilt, however, is resisted by the tension present in cable 20 as well as its mass, both depicted as being concentrated at the center of rope 1 and having a substantial component in a downward direction, denoted by the arrow 27.

In opposing the twisting torque 26, the downward component 27 operates on a moment arm equal to the distance between it and the contact point of the cable side 13 with the sheave bed 23. Owing to the rounded sides 13, 14 of the cable, the said contact point moves away from the component 27, if and as the cable 20 actually tilts. In consequence, pursuant to another aspect of this invention, the moment arm is not diminished as it would be if the sides were abruptly cornered. Thus, more force is available to counteract the externally generated torque.

In practice, the relatively vulnerable coaxial cable when protected pursuant to the invention experiences minimal internally generated torques; and any normally encountered external torque is prevented from reaching beyond the point of contact between the cable and the sheave. Further, the cable shown in FIG. 1 is remarkably free of stiffening tendency during coiling in cable ship storage tanks.

Figure 2:
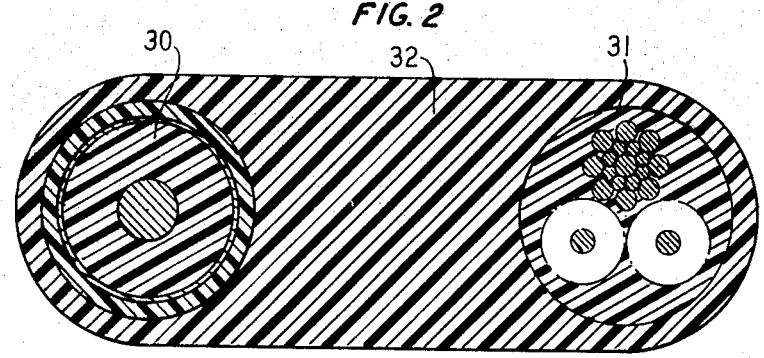
Figure 3:
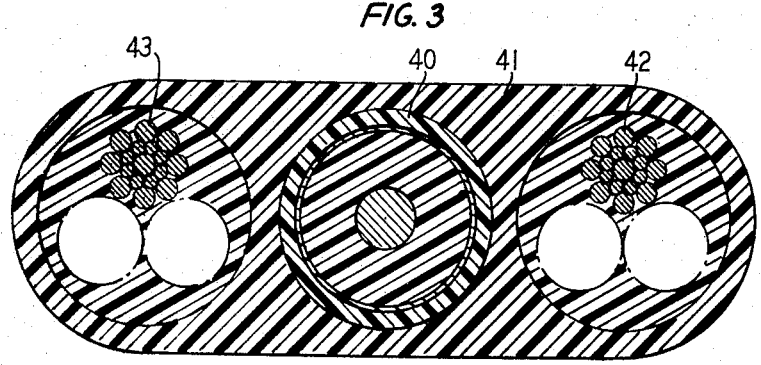

FIGS. 2 and 3 depict exemplary inventive variations. In FIG. 2, a single coaxial unit 30 and a single torque-balanced wire rope 31 are housed in the flattened outer jacket 32 which in structure and functions is substantially identical to that depicted in FIG. 1. Similarly, in FIG. 3 a single central coaxial unit 40 is flanked in a jacket 41 by two wire ropes (or strands) 42, 43 which are not by themselves torsionally balanced but which in tension develop opposite torsions.

In all embodiments, the components are basically cylindrical in shape and hence have longitudinal axes. Also, the sides 13, 14 are preferably rounded to a single specified radius. At any cross section the component axes as well as the centers of curvature of the two rounded sides in the preferred embodiment fall in a line, and such lines form a flat plane along the length of the cable.

The invention principally embraces the combination of torque-balanced tension members, laterally removed but still coplanar with respect to the coaxial unit; and the flattened cable profile made possible by the side-by-side relationship of the interior components. It thus is evident that the interior components can be varied provided they meet the foregoing requirements.

I claim:

1. An undersea communications cable comprising at least one coaxial line, and torque-balanced stranded strength means exterior to said line, said line and said means enveloped in an outer jacket having extended, flat top and bottom portions and radially rounded sides.

2. An undersea communications cable comprising:
   at least one coaxial line;
   torque-balanced stranded strength means exterior to said line; and
   an outer jacket having flattened outer top and bottom portions and radially rounded sides enveloping said coaxial line and said strength means and maintaining same axially coplanar.

3. Apparatus pursuant to claim 2, wherein said strength means comprises a torque-balanced wire rope centrally generated torques; said jacket, wherein said coaxial line flanks said rope on one side, and further comprising a communications unit consisting of plural insulated the flanking shown rope on its second side.

4. Apparatus pursuant to claim 2, wherein said coaxial line is centrally placed within said jacket, and wherein said strength means consists of first and second wire ropes stranded in helically opposite directions to achieve an aggregate torque balance, the axes of said ropes and said line being coplanar.

5. Apparatus pursuant to claim 2, wherein the ratio of the cable height $h$ to the width $w$ of the flat top and bottom portion is from 1.0 to 0.2.

6. Apparatus pursuant to claim 5, wherein the centers of curvature of said radially rounded sides are coplanar with the longitudinal axes of all said coaxial lines and stranded strength means.